United States Patent [19]

Sinkkilä

[11] Patent Number: 4,616,715
[45] Date of Patent: Oct. 14, 1986

[54] FOREST MATTOCK WITH BRAKED ROTATION SYSTEM

[76] Inventor: Aarre Sinkkilä, 16630 Tennilä, Finland

[21] Appl. No.: 560,800

[22] Filed: Dec. 13, 1983

[30] Foreign Application Priority Data

Dec. 15, 1982 [FI] Finland .................................. 824301

[51] Int. Cl.$^4$ ............................................. A01B 39/08
[52] U.S. Cl. ........................................ 172/61; 172/72; 172/125
[58] Field of Search ................... 172/2, 21, 52, 60, 61, 172/62, 72, 114, 116, 120, 125, 182, 183, 528, 529, 530; 111/2, 6, 89, 91

[56] References Cited

U.S. PATENT DOCUMENTS

| | | | |
|---|---|---|---|
| 388,428 | 8/1888 | McCormick | 172/183 |
| 1,800,634 | 4/1931 | Isenberg | 172/529 |
| 2,221,550 | 11/1940 | Lindgren | 172/530 |
| 2,337,620 | 12/1943 | Peacock | 172/530 |

FOREIGN PATENT DOCUMENTS

| | | | |
|---|---|---|---|
| 30783/30 | 5/1931 | Australia | 172/62 |
| 162008 | 3/1955 | Australia | 172/528 |
| 143417 | 12/1953 | Sweden | 172/528 |
| 275322 | 8/1951 | Switzerland | 172/529 |
| 494132 | 2/1976 | U.S.S.R. | 172/529 |

Primary Examiner—Richard T. Stouffer
Attorney, Agent, or Firm—Paul M. Denk

[57] ABSTRACT

A rotation control system for the mattock (2) of a tuft-building forest mattock, whereby rotation of the mattock is adapted to be braked or stopped stepwise in a manner that each pick (3) in turn works a whole in the first stage, in the second stage the pick (3) of the mattock removes surface deposit from between the obtained hole and a tuft to be built, and in the third stage, as mattock (2) is allowed to rotate freely, pick (3) leaves the loosened earth behind as a tuft. In order to make the sticking angle and depth dictated by the start moment of braking stages readily adjustable according to various qualities of soil, at a certain angle of rotation of the mattock a first impulse sensor actuates a first delay timer (6), adapted after a settable delay time to turn on a brake (11) for setting out the first stage of the mattock (2). As a certain angle of rotation of the mattock, a second impulse sensor (5) actuates a second delay timer (7), adapted after a certain delay time to turn on said brake (11) for setting out the second stage of the mattock (2). The duration of the first and second stage, i.e. the braking effect stopping the rotation of the mattock (2), is adapted to be controlled each by its own timer (8 and 9) whose setting time is adjustable.

5 Claims, 2 Drawing Figures

FOREST MATTOCK WITH BRAKED ROTATION SYSTEM

BACKGROUND OF THE INVENTION

It is general practice in forestry for planting tree seedlings to mechanically hoe or spot the soil in order to bring out mineral soil from beneath the vegetation and organic surface stratum. However, the quality of soil varies dramatically, being sometimes moist, sometimes dry and the thickness of said organic surface stratum also varies. A general object of the invention is to provide a forest mattock which is as highly capable as possible of taking the quality of soil into consideration.

SUMMARY OF THE INVENTION

The invention relates to a rotation control system for the mattock means of a tuft-building forest mattock, by means of which rotation of said mattock means is adapted to brake or be stopped stepwise in a manner that each pick in turn digs a hole in the first step, in the second step the pick of a mattock means removes some of the surface stratum between the finished hole and a resulting tuft and in the third step, as the mattock means is allowed to rotate freely, the pick leaves the loosened soil as a tuft.

In the first step or stage, the hoeing pick is directed essentially downwards and its sticking angle is such that a relatively deep hole can be made. Thus, mineral soil can be exposed from the hole even if it lies relatively deep. In the second stage, mineral soil mixes with the organic surface deposit which in the third stage will be left behind as a tuft. This offers the following planting possibilities. In wet spots, a seedling can be planted on top of the tuft obtained. In dry spots, a seedling can be planted within the hole where it can take advantage of the water accumulating in the hole. Otherwise, a seedling can be planted in the range between the hole and the tuft where vegetation and organic surface deposit has been removed. When planting is done, the roots of a seedling must be extended down to the mineral soil. The mineral soil contained in a tuft has been obtained from the hole.

For best possible results, the sticking angle and thus the sticking depth of a pick should be adjustable according to various qualities of soil. In order to adapt the adjustment or control also to practical work, it must be arranged so that an operator is able to effect the control from his cabin during the drive. The sticking angle of a pick can be adjusted by controlling the starting time of braking steps of the mattock means' rotation.

A control system of the invention is characterized in that at a certain angle of rotation of a mattock means a first impulse sensor actuates a first delay timer which is adapted after an adjustable delay time to turn the brake on for beginning of the first step of a mattock means, and that at a certain angle of rotation of a mattock means a second impulse sensor actuates a second delay timer which is adapted after an adjustable delay time to turn on the brake for beginning of the second step of a mattock means. By regulating the delay times of delay timers, the operator of a work machine pulling said forest mattock is able to control during the drive the sticking angle of a pick and thus the sticking depth during the first and second operating step, wherein the pick works out a hole and the following removal of surface deposit.

According to a preferred embodiment of the invention, the duration of a first and second step is also adapted to be controllable each by its own timer, said timers setting the braking period. Thus the depth and length ratio of a hole can be determined, as also the depth and length of the surface deposit removal following the hole.

BRIEF DESCRIPTION OF THE DRAWINGS

The invention will now be described in more detail with reference made to the accompanying drawings, in which.

DESCRIPTION OF THE PREFERRED EMBODIMENTS

Figure 1:
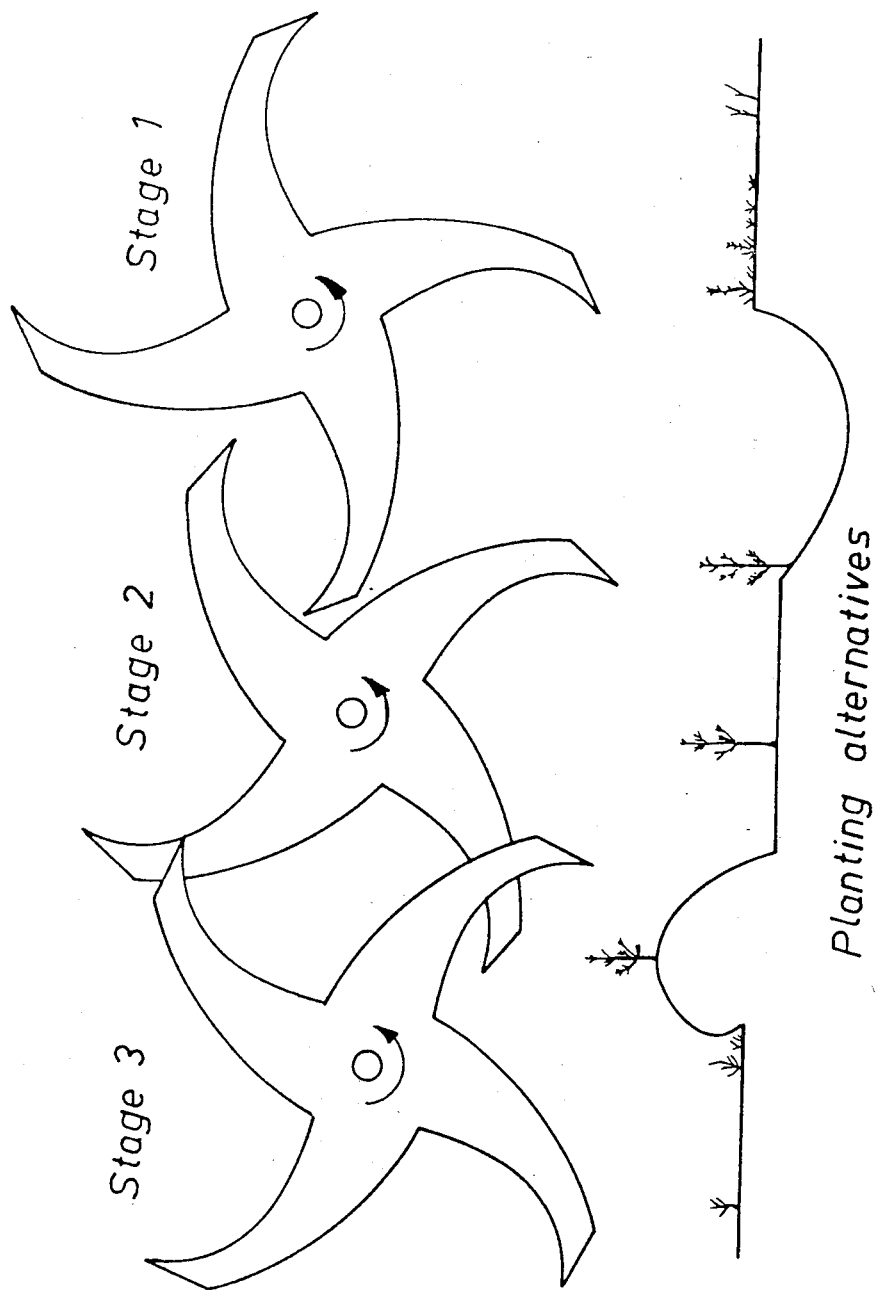
FIG. 1 shows positions of a mattock means in its various working stages and illustrates also various planting alternatives accomplished in the soil by means of these working stages.

The various working stages of a mattock are first explained with reference of FIG. 1. In stage 1, the downwards pointing pick of a mattock means is in a position, wherein it sinks relatively deep into the ground due to the position and design of said pick. After a determined period of time, the mattock means is allowed to turn a little rearwards thus turning the pick into a position (stage 2), wherein it does not seek to penetrate into the ground as vigorously as in stage 1. In the position of stage 2, the pick only works to remove the vegetation and organic surface deposit while, at the same time, the mineral soil picked out of a hole made in stage 1 mixes with the surface deposit. After a determined period of time, the mattock means is allowed to rotate so far that the following pick assumes the position of stage 3, the rising pick leaving the soil in front it as a tuft (stage 3). It can be concluded from FIG. 1 that this action provides a plurality of various planting alternatives corresponding to various working stages of a mattock means.

Figure 2:
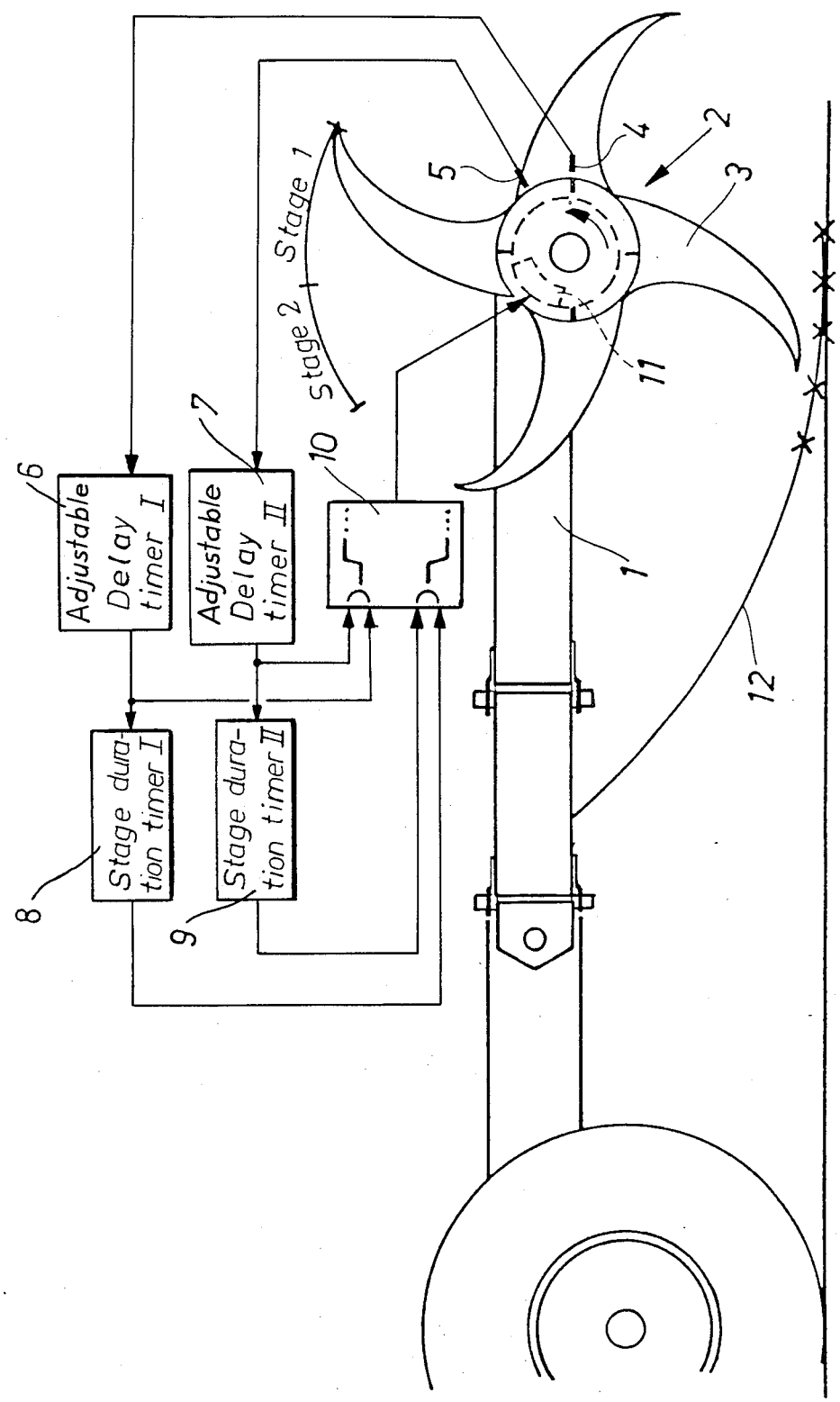
FIG. 2 is a side view of a forest mattock, showing in block diagram a rotation control system for a mattock means associated therewith.

With reference to FIG. 2, the following description deals with a rotation control system for a mattock means, said system effecting the sequence shown in FIG. 1 in a controllable manner. At the rear of a power machine, such as a tractor, there is coupled by means of a pulling beam 1 a mattock means 2, comprising a rotatably journalled gear with mattock or hoeing pick 3 extending substantially radially therefrom. While the mattock is being pulled, a brake, e.g. a disc brake 11 is applied to decelerate rotation of mattock means 2 and, thus, pick 3 penetrates into the ground during braking. The sticking angle and plunging depth of said pick 3 is dictated by the angular position for both stage 1 and stage 2, the mattock is provided with a control system described hereinbelow.

The earliest possible starting time for stage 1 is determined by a pulse sensor 4 at each pick 3. When pick 3 assumes this earliest possible position of stage 1 (shown in FIG. 2), said pulse sensor 4 feeds a start pulse to a delay timer 6 which after a settable delay time issues an actuation pulse for both a stage duration timer 8 and a control circuit 10 of brake 11. Circuit 10 turns on brake 11, whereby rotation of mattock means 2 stops and pick 3 starts to penetrate into the ground at a sticking angle that was determined on the basis of the delay time set in delay timer 6. When the time, which is also adjustable and set in phase duration timer 8, has lapsed, said timer 8 issues a pulse to control circuit 10 which releases brake 11, allowing mattock means 2 rotate towards the position of stage 2. The earliest possible start position of stage 2 is dictated by pulse sensor 5. Sensor 5 feeds a pulse to a delay timer 7 whose delay time is adjustable for controlling the starting moment of stage 2. When the delay time set in delay timer 7 has lapsed, said delay timer 7 issues an actuation pulse on one hand to a stage duration timer 9 and on the other hand to brake control circuit 10. Control circuit 10 turns on brake 11 and stops the rotation of mattock means 2, whereby pick 3 effects the surface deposit removal of stage 2. The sticking or scraping angle of pick 3 and the penetrating depth dictated thereby depends thus on the delay time set in delay timer 7. When the time set in stage duration timer 9 determining the braking period of stage 2 has lapsed, timer 9 issues a pulse to control circuit 10 which releases brake 11, allowing said mattock means 2 to rotate for building a tuft as shown in the third operating stage. Free rotation proceeds until the pulsing means of a following pick reaches pulse sensor 4 and, after the time set in delay timer 6, brake 11 stops the rotation of mattock means 2.

It will be appreciated that an essential part of the invention is the operation of delay timers 6 and 7 since by means of those timers it is quite easy to adjust the sticking angle of pick 3 from the cabin during operating stages 1 and 2. On the other hand, stage duration timers 8 and 9 are used to control the durations of hole digging and the following surface deposit removal. This control is necessary also for the reason that the driving speeds also vary on various terrains. The control can also be effected automatically according to driving speed. By using a measuring counter of travelling speed, a change in driving speed can re-adjust the time set in timers according to driving speed.

By virtue of its versatile control possibilities, a forest mattock fitted with a control system of the invention can also be operated on rocky grounds. The apparatus does not accumulate chippings or brushwood in front of it. The mattock is light to pull, contributing to low fuel consumption and little stress on a tractor.

In order to eliminate an unduly thick deposit of brushwood and moss beneath a tuft to be formed, which deposit would break the contact between the mineral soil in the tuft and the solid earth deposit below said tuft, said pulling beam 1 has connected thereto a drag 12, located between two rotatable, parallel gears 2. Drag 12 is provided with gripping means which rip along brushwood, earth and moss. When a heavy tuft is built on top of said drag 12, the gripping means serve to rip away brushwood and moss deposit from between the tuft and the ground.

I claim:

1. A turf-building forest mattock, for use in timed digging, grading the surface, and accumulating earth upon the ground during its operations, comprising a mattock means in the form of a gear with multiple picks, the rotation of said mattock means being adapted to be braked stepwise in a timed manner that each pick of the gear in turn works the ground in a first digging stage, brake means operatively associated with the mattock means to stop its turning while one of said picks digs into the ground to form a hole during said first digging stage, sensor means responsive to a first pick position, a timer means responsive to the sensor means and timing the length of time during which one of said picks of the mattock means digs within the ground, the timer means after a short segment of time signaling a release of the brake means for the turning of the mattock means for a short distance and in a manner that provides an intermediate work stage of the mattock means wherein one of said pick of said mattock means removes surface deposits from the ground in front of the finished hole, and said one of said picks of the mattock means after a defined removal of surface deposits releases the turf to be built into a mound of earth upon the ground.

2. A rotational control system for a mattock means of a turf-building forest mattock according to claim 1, whereby the limited rotation of said mattock means and its gear with multiple picks is adapted to be braked stepwise in a timed manner that each pick of the mattock means in turn initially works a hole in the ground during its first stage of operation, the select pick of the mattock means in the second stage of its operation removes surface deposits from in front of the resulting hole, and said pick of the mattock means during its third stage of operation being allowed to rotate freely, with said pick leaving the loosened earth behind as built up turf, said steps of operation of the mattock means characterized in that said sensor means including a first impulse sensor responsive to the first pick position of digging, said timer means including a first delay timer set by the first impulse sensor for establishing the first digging stage of the mattock means, and after a timed delay the brake being released for turning of the mattock means for a certain angle of rotation when a second impulse sensor actuates a second delay timer of the timer means and which is adapted after a certain delay of time to turn on the brake for establishment of the stage when the mattock means removes surface deposits from the ground.

3. The invention of claim 2 and wherein said braking means stops the rotation of the mattock means during its first and second stages of operation, the actuation of said braking means being controlled for that length of time as established by the first and second delay timers of the timer means.

4. The invention of claim 3 and wherein the delay timers being adapted for issuing actuation impulses after a certain delay of time for turning on the brake means for that period of time adjustable setting for each timer for functioning of select stages of operation of the mattock means.

5. The invention of claim 4 and wherein a pulling beam operatively associated with the mattock means, a drag interconnecting with the pulling beam and which drags on the ground and extends in between adjacent picks of the mattock's means, gripping means operatively associated with the drag and functioning to rip away brush wood and other surface deposits from the ground.

* * * * *